US008154438B1

(12) United States Patent
Larson et al.

(10) Patent No.: US 8,154,438 B1
(45) Date of Patent: Apr. 10, 2012

(54) REGISTRATION OF LATITUDE/LONGITUDE COORDINATES USING RANGE DETECTION SENSORS AND DIGITAL NAUTICAL CHARTS

(75) Inventors: Jacoby Larson, San Diego, CA (US); Michael Bruch, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 324 days.

(21) Appl. No.: 12/555,112

(22) Filed: Sep. 8, 2009

(51) Int. Cl.
G01S 13/88 (2006.01)
G01S 13/89 (2006.01)
G01S 13/00 (2006.01)

(52) U.S. Cl. ............ 342/145; 367/87; 367/99; 367/100; 382/100; 356/3; 356/4.01; 356/5.01; 342/41; 342/52; 342/53; 342/54; 342/55; 342/61; 342/118; 342/175; 342/176; 342/179; 342/195

(58) Field of Classification Search ....... 342/25 R–25 F, 342/52–55, 61–66, 118, 145, 175, 176, 179, 342/195, 450–465, 89, 90, 190, 191, 41, 342/120–123; 345/156, 157, 158; 701/1, 701/23–28, 200, 207, 223, 300, 301; 382/100, 382/103, 276, 293; 367/87, 99, 100, 101–116; 356/3, 4.01, 5.01–5.08
See application file for complete search history.

(56) References Cited

U.S. PATENT DOCUMENTS

| 3,299,425 | A | * | 1/1967 | Smith et al. | 342/64 |
|---|---|---|---|---|---|
| 4,179,693 | A | * | 12/1979 | Evans et al. | 342/64 |
| 4,688,092 | A | * | 8/1987 | Kamel et al. | 382/103 |
| 4,914,734 | A | * | 4/1990 | Love et al. | 342/64 |
| 5,272,639 | A | * | 12/1993 | McGuffin | 701/207 |
| 5,335,181 | A | * | 8/1994 | McGuffin | 701/200 |
| 5,430,445 | A | * | 7/1995 | Peregrim et al. | 342/62 |
| 5,581,259 | A | * | 12/1996 | Schipper | 342/451 |
| 5,781,146 | A | * | 7/1998 | Frederick | 342/179 |
| 5,785,281 | A | * | 7/1998 | Peter et al. | 701/223 |
| 5,786,804 | A | * | 7/1998 | Gordon | 345/158 |
| 5,848,373 | A | * | 12/1998 | DeLorme et al. | 701/200 |
| 5,995,681 | A | * | 11/1999 | Lee et al. | 382/293 |

(Continued)

OTHER PUBLICATIONS

Autonomous Navigation and Obstacle Avoidance for Unmanned Surface Vehicles, Jacoby Larson et al, SPIE Unmanned Systems Technology VIII, Orlando. FL Apr. 17-20, 2006.

(Continued)

*Primary Examiner* — Bernarr Gregory
(74) *Attorney, Agent, or Firm* — Kyle Eppele; Stephen E. Baldwin

(57) ABSTRACT

The present invention can find the exact location anywhere in the nautical world (latitude/longitude coordinates) by correlating or matching radar returns with maps produced by a digital nautical chart called a Chart Server, because each pixel location on the Chart Server maps can be traced back to a latitude/longitude coordinate. An obstacle avoidance module called a Chart Server provides digital nautical charts to create a map of the world. To determine the current world location of a vehicle, the invention combines the Chart Server maps with a radar return, which also appears to display prominent features such as coastlines, buoys, piers and the like. These return features from the radar are correlated or matched with features found in the Chart Server maps. The radar then reports its current location inside of its local map, which when translated to the Chart Server map, correlates to a latitude/longitude registration location.

9 Claims, 12 Drawing Sheets

U.S. PATENT DOCUMENTS

| | | | | |
|---|---|---|---|---|
| 6,016,116 A * | 1/2000 | Henderson et al. | | 342/64 |
| 6,208,933 B1 * | 3/2001 | Lazar | | 701/207 |
| 6,233,522 B1 * | 5/2001 | Morici | | 342/64 |
| 6,691,947 B2 * | 2/2004 | La Fata | | 342/52 |
| 6,853,332 B1 * | 2/2005 | Brookes | | 342/63 |
| 7,522,090 B2 * | 4/2009 | Hawkinson | | 342/64 |

OTHER PUBLICATIONS

Advances in Autonomous Obstacle Avoidance for Unmanned Surface Vehicles, Jacoby Larson et al, AUVSI Unmanned Systems North America 2007, Washington DC, Aug. 6-9, 2007.

* cited by examiner

REGISTRATION OF LATITUDE/LONGITUDE COORDINATES USING RANGE DETECTION SENSORS AND DIGITAL NAUTICAL CHARTS

FEDERALLY-SPONSORED RESEARCH AND DEVELOPMENT

This invention (Navy Case No. 99505) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

BACKGROUND OF THE INVENTION

As described in an article entitled "Autonomous Navigation And Obstacle Avoidance For Unmanned Surface Vehicles", SPIE Unmanned Systems Technology VIII, Orlando. Fla. (April, 2006-hereinafter the "SPIE 2006 article"), the US Navy and other Department of Defense (DoD) and Department of Homeland Security (DHS) organizations are increasingly interested in the use of unmanned surface vehicles (USVs) for a variety of missions and applications. In order for USVs to fill these roles, they must be capable of a relatively high degree of autonomous navigation. Space and Naval Warfare Systems Center, Pacific is developing core technologies required for robust USV operation in a real-world environment, primarily focusing on autonomous navigation, obstacle avoidance, and path planning. As part of that focus, it would be desirable to provide for the improved registration of latitude/longitude coordinates anywhere in the nautical world.

SUMMARY

The present invention can find the exact location anywhere in the nautical world (latitude/longitude coordinates) by correlating or matching radar returns with maps produced by a digital nautical chart called a Chart Server, because each pixel location on the Chart Server maps can be traced back to a latitude/longitude coordinate. An obstacle avoidance module called a Chart Server provides digital nautical charts to create a map of the world. To determine the current world location of a vehicle, the invention combines the Chart Server maps with a radar return, which also appears to display prominent features such as coastlines, buoys, piers and the like.

These return features from the radar are matched with features found in the Chart Server maps. The radar then reports its current location inside of its local map, which when translated to the Chart Server map, correlates to a latitude/longitude registration location.

BRIEF DESCRIPTION OF THE DRAWINGS

Throughout the several views, like elements are referenced using like references.

DETAILED DESCRIPTION OF THE EMBODIMENTS

As described above in the referenced SPIE 2006 article, the US Navy and other Department of Defense (DoD) and Department of Homeland Security (DHS) organizations are increasingly interested in the use of unmanned surface vehicles (USVs) for a variety of missions and applications. In order for USVs to fill these roles, they must be capable of a relatively high degree of autonomous navigation. Space and Naval Warfare Systems Center, Pacific is developing core technologies required for robust USV operation in a real-world environment, primarily focusing on autonomous navigation, obstacle avoidance, and path planning.

The concept for the Space and Naval Warfare Systems Center, Pacific (SSC Pacific, previously known as SSC San Diego) USV was rapid production of a low-cost reliable platform to develop technology for transition to other unmanned assets and programs. The USV platform was chosen for its low cost, ease of systems integration, low maintenance, and similarity in performance characteristics to operational USVs. The platform itself is not the focus of the program but simply a convenient host for the core USV technologies being developed that will then be transitioned to other USV efforts in the Navy.

Figure 1:
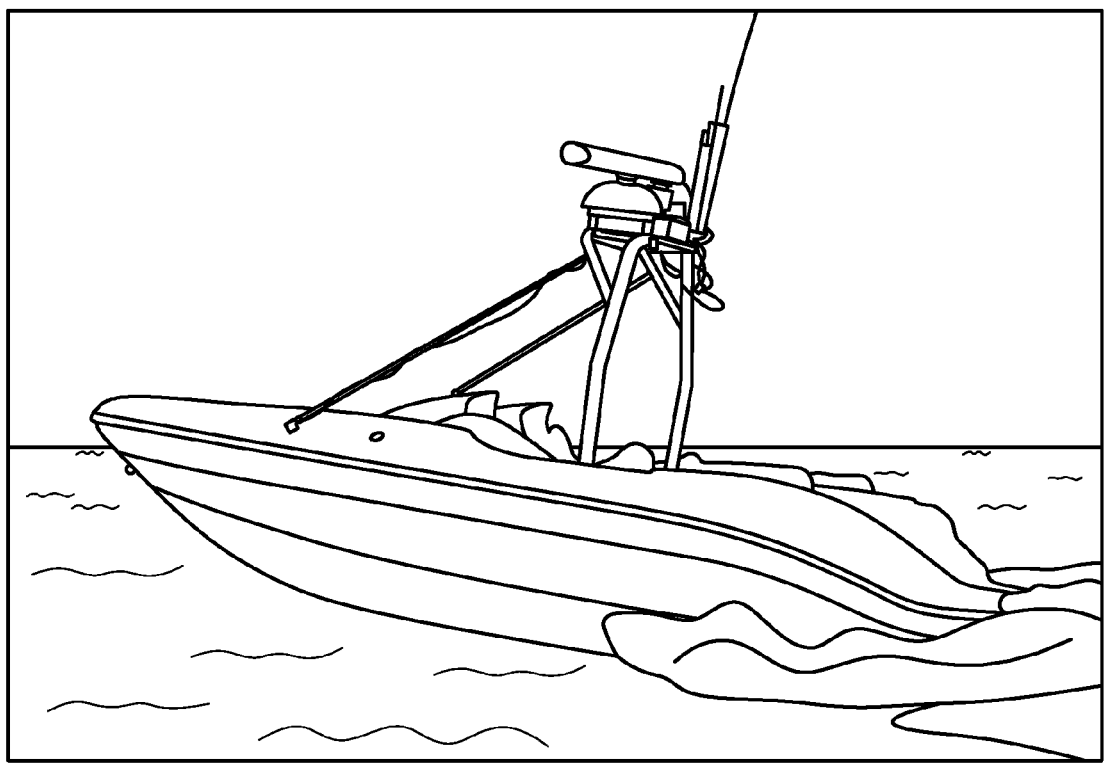
FIG. 1 shows a view of an unmanned surface vehicle which can be utilized with the present invention.

The platform selected for this development effort is a SEADOO Challenger 2000 sport boat 10 with a jet drive, shown in FIG. 1, configured as an unmanned vessel, operating autonomously in open water.

Figure 2:
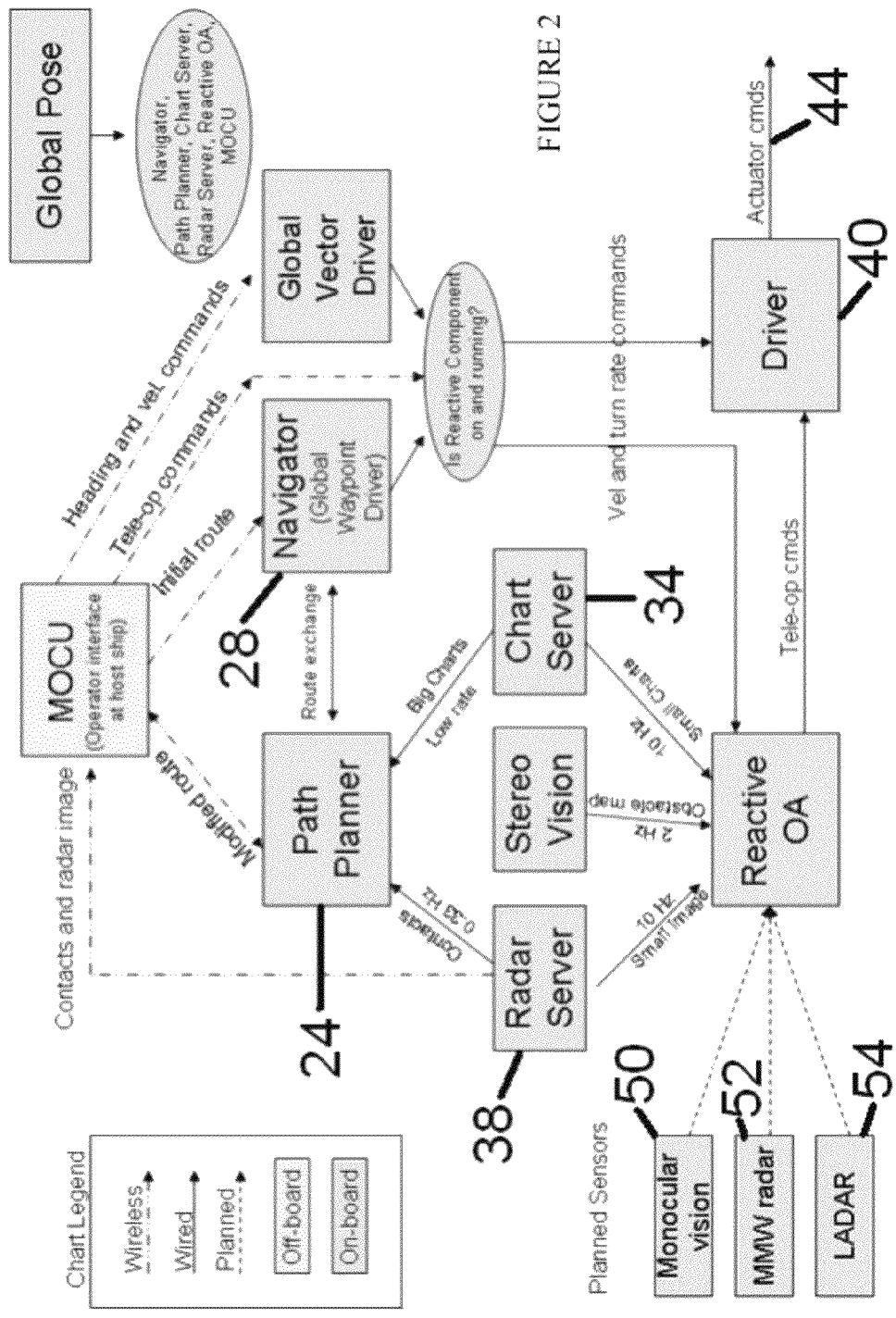
FIG. 2 shows a block diagram of the software architecture of the present invention.

To help set a frame of reference, the USV obstacle avoidance software architecture will be addressed, but only at a high level. FIG. 2 shows a basic block diagram of the OA software architecture 20 as it exists on the USV of FIG. 1. An attempt has been made to modularize the OA software into distinct functional components.

The deliberative OA component consists primarily of the Path Planner 24, which interfaces directly with the Navigator 28. The Path Planner 24 receives data from both Chart Server 34 and Radar Server 38. The reactive component intercepts the tele-operation or driving commands from the Navigator 28 and modifies them before forwarding them to the Driver 40 for execution at the actuators 44. The reactive component also interfaces with the Radar Server 38 and Chart Server 34, but receives different types of data than is received by the Path Planner 24. The reactive component receives data from the other near-field sensors as well, such as the vision 50 and ladar 52, 54 systems. It is worth noting that all of the interconnecting lines in the block diagram are Joint Architecture for Unmanned Systems (JAUS) messages. In the future, the use of standard messages for the component interfaces should allow the unmanned systems community to exchange and share basic navigation components.

The task of the deliberative obstacle avoidance component is to plan a path in the far-field that follows the original path as much as possible and avoids obstacles, both moving and stationary. It does this with the help of a Path Planner using a two-dimensional (2D) obstacle map. The obstacle map is essentially an occupancy grid, which is created by dividing the environment into a discrete grid and assigning each cell location a value representing the probability of being occupied or not occupied by an obstacle. The map for the deliberative OA component is filled with stationary obstacles from the Chart Server 34 and moving obstacles provided by the radar server 38 in the form of Automated Radar Plotting Aid (ARPA) contacts.

Further details of the obstacle avoidance aspects are described in the above SPIE 2006 article. The more detailed aspects of the latitude/longitude registration process of the present invention will now be described.

The present invention can find the exact location anywhere in the nautical world (latitude/longitude coordinates) by correlating or matching radar returns with maps produced by a digital nautical chart called a Chart Server, because each pixel location on the Chart Server maps can be traced back to a latitude/longitude coordinate.

One current method of finding latitude/longitude coordinates in the world is to use GPS. This will work well most of the time, but when GPS fails (such as due to satellite or antenna problems), it would be useful to have other means of determining exact coordinate location.

There is much work being done in the areas of simultaneous localization and mapping (SLAM), but none of them combine radar and digital nautical charts, nor do they use matching maps to report a latitude/longitude coordinate in the world. Mostly, SLAM is used to map an unknown area and localize an object (such as an unmanned vehicle) inside that area, but not in the world. SLAM in most cases uses sensors such as laser rangefinders, sonar and cameras.

An obstacle avoidance module called a Chart Server provides digital nautical charts to create a map of the world. To determine the current world location of a vehicle, the invention combines the Chart Server maps with a radar return, which also appears to display prominent features such as coastlines, buoys, piers and the like.

These return features from the radar are matched with features found in the Chart Server maps. The radar then reports its current location inside of its local map, which when translated to the Chart Server map, correlates to a latitude/longitude location.

The present invention has the advantage of current systems because nothing currently exists for determining the latitude/longitude using these two sensors or using SLAM. This will be beneficial when GPS is lost such as when hardware malfunctions or if GPS satellites are unavailable (indoors, underground).

The National Geospatial-Intelligence Agency's (NGA) Digital Nautical Charts (DNC) are, according to the NGA website, an unclassified, vector-based, digital database containing maritime significant features essential for safe marine navigation. The DNC database consists of 29 digital nautical chart geographic regions providing a complete worldwide footprint containing several thousands of charts of varying scales.

The Chart Server 34 shown in FIG. 2 was created to parse through the hierarchy of thousands of files and convert all the locations of permanent stationary obstacles (coastlines, piers, buoys, shallow water, etc.) from latitude/longitude points to occupancy grid pixels in the obstacle map. The Chart Server 34 sorts the DNC data into four main categories of obstacles: above water, on the water's surface, below water, and land. Only those features with attributes of vertical clearance, horizontal clearance, or depth clearance that constitute a threat to the USV are added to the obstacle map. The data in the DNC is encoded in a Vector Product Format (VPF), signifying that the data can be represented at any resolution without losing quality. This will become very important as the USV tackles missions ranging in hundreds of nautical miles but still avoiding obstacles in channels no wider than 50 yards.

Once the obstacle map has been created at a resolution beneficial for planning an obstacle free route, it is delivered to the deliberative OA component. This map is dynamically updated whenever the USV moves close to the edge of the map, when it is close to the edge of the DNC libraries, boundaries, or when a new route extends beyond the edge of the map.

Currently the maps are created at a scale of 1000 pixels wide by 1000 pixels high, with each pixel representing 10 meters by 10 meters. This resolution was chosen based on the size of the USV, the size of most relevant obstacles, and the intent to keep a safe zone around the USV of at least 50 meters.

The radar system shown in FIG. 2 on the SSC Pacific USV is a standard marine radar (Furuno) with a third-party PC controller. The controller, developed by Xenex Innovations Ltd., provides a digital networked interface for the radar. The Xenex system provides an API to access the radar data and controls as well as an Advanced Radar Plotting Aid (ARPA) Software Development Kit (SDK), which provides algorithms to automatically acquire and track up to 100 contacts.

SSC Pacific has invested a significant amount of effort in characterizing the performance of the radar's ARPA function as this is the primary means of detecting uncharted obstacles in the far-field. As with any sensor in the real world there are many idiosyncrasies with the ARPA function. One significant problem with the radar is that it tends to classify noise from the shoreline return as contacts which are often shown to be moving at a significant velocity and in the direction of the USV. These false contacts are obviously detrimental to the successful operation of the path planner.

As described in the SPIE 2006 article, to mitigate this problem, the on-board nautical Chart Server can be used to calculate polygons that follow the shoreline and structures along the shoreline. The radar contacts are compared with these polygons and those that fall inside a polygon are rejected and deleted from the radar's list.

FIGS. 3-12 show image displays of the most southern tip of Point Loma, San Diego, Calif. in different forms, utilizing the aspects of the present invention, all showing the land of Point Loma and the buoys that mark the entrance to the harbor of San Diego. As will be shown in FIGS. 3-12, the present invention provides filtering techniques to enable the latitude/longitude registration process.

Figure 3:
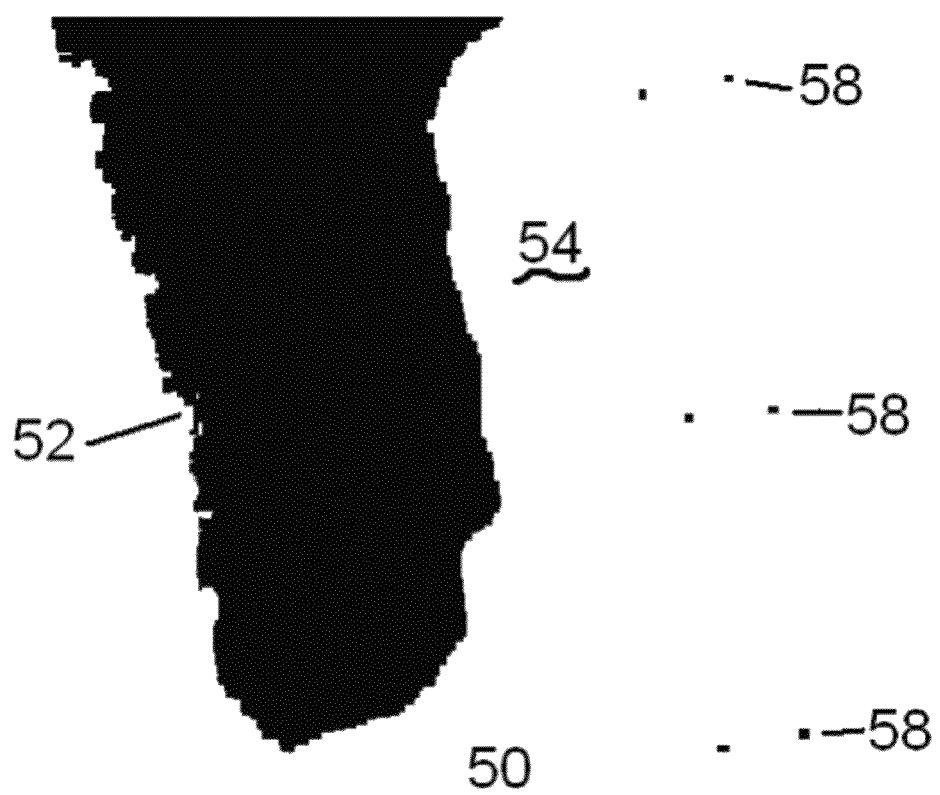
FIGS. 3-12 show various image displays of Pt. Loma, San Diego, Calif., utilizing the various aspects of the present invention.

FIG. 3 (Chart1.bmp) shows an image display 50, showing Point Loma land mass 52, water 54, and buoys 58. FIG. 3 would also show piers, bridges, pilings, and drydocks, if any of those items were found in the area. FIG. 3 was prepared using SSC Pacific's Chart Server application of FIG. 2, which creates obstacle maps from National Geospatial-Intelligence Agency's (NGA) Digital Nautical Charts (DNC), described above.

Figure 4:
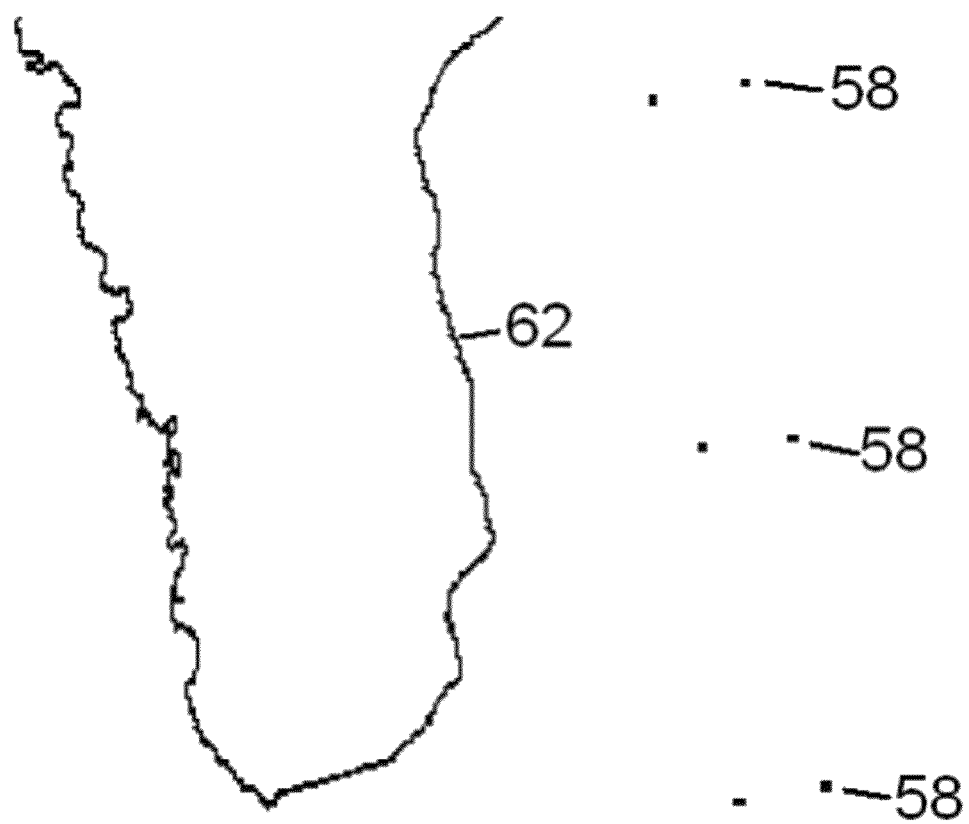

FIG. 4 (Chart2.bmp) shows image display 60, which is the same image as FIG. 3 (Chart1.bmp), but without the land mass 52 filled in. FIG. 4 is created from SSC Pacific's Chart-Server application, but with filtering techniques, as will be described, only showing the coastlines 62 and buoys 58.

Figure 5:
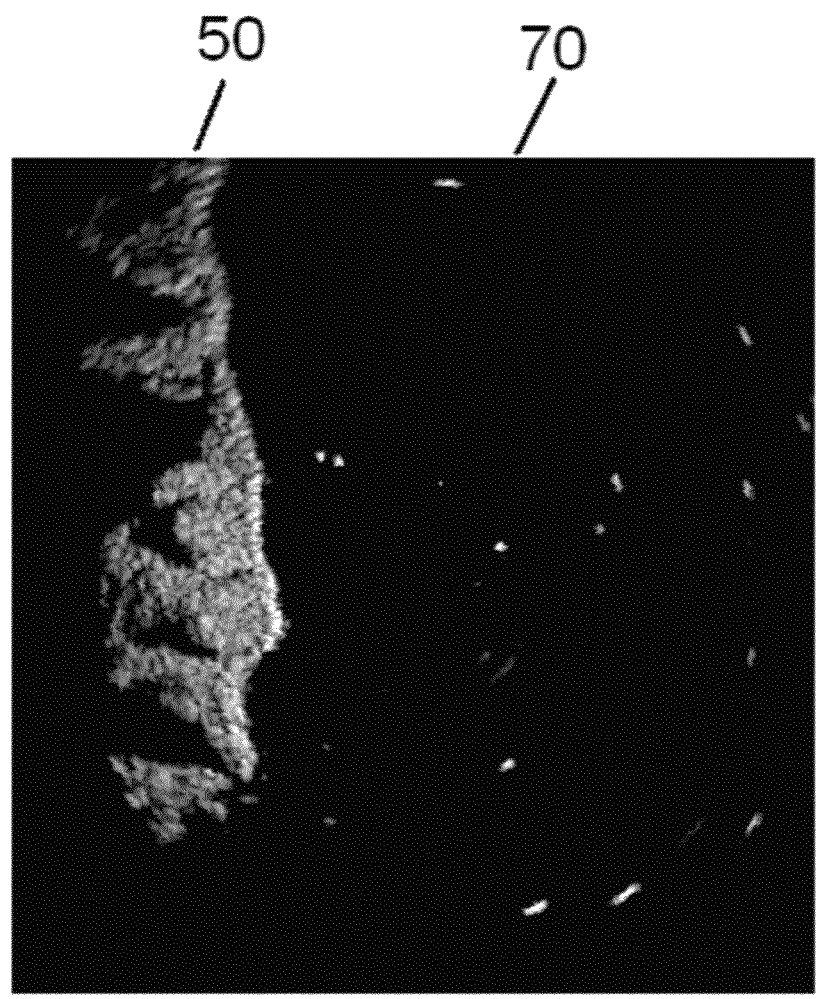

FIG. 5 (Radar.bmp) shows the raw radar returns 70 of the same area on a black background, which shows the land mass 50 of Point Loma, some buoys 58, and a few other returns of other ships or noise.

Figure 6:
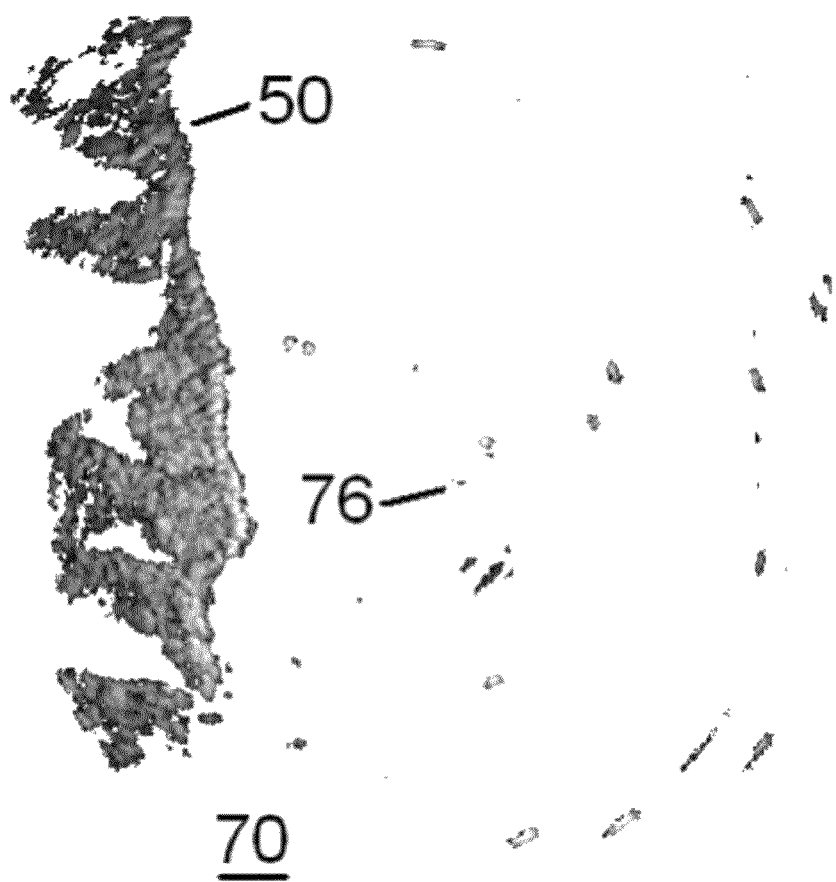

FIG. 6 (Radar1.bmp) shows the radar return 70 on a white background, showing the Point Loma land mass 50. The center portion 76 of radar return 70 shown in FIG. 6 is the latitude/longitude coordinate for which registration is sought.

Figure 7:
Figure 8:
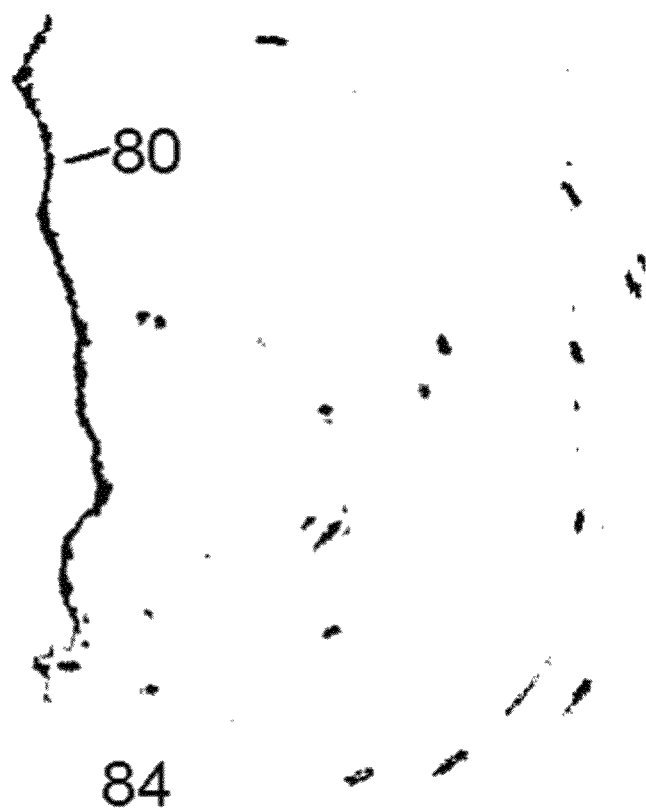

FIG. 7 (Radar1bw.bmp) shows an image display 78, which is the same image as FIG. 6 (radar1.bmp) but in black and white FIG. 8 (Radar2bw.bmp) shows the filtered radar image 84 that would be used in the correlation function. The FIG. 8 image uses a filtering technique created by keeping only the first few pixels of land masses, which creates a natural coastline 80. This is done by using an imaginary ray from the center of the image, rotating that ray 360 degrees, and only keeping the first few pixels that it hits along that ray.

Figure 9:
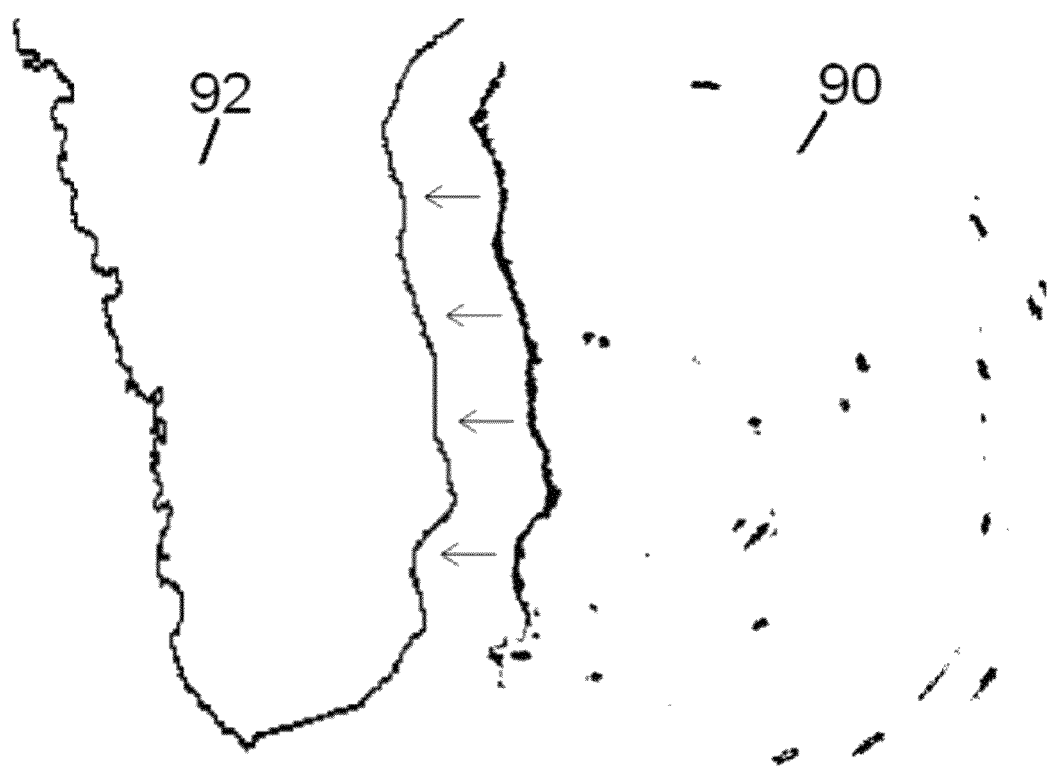

FIG. 9 (Chartradarcombine1.bmp) shows how the radar image 90 corresponds to the chart image 92. The exact fitting of the radar image and the chart image shown in FIG. 9 can be done using a Fourier transform and phase correlation or an iterative closest point algorithm.

Figure 10:
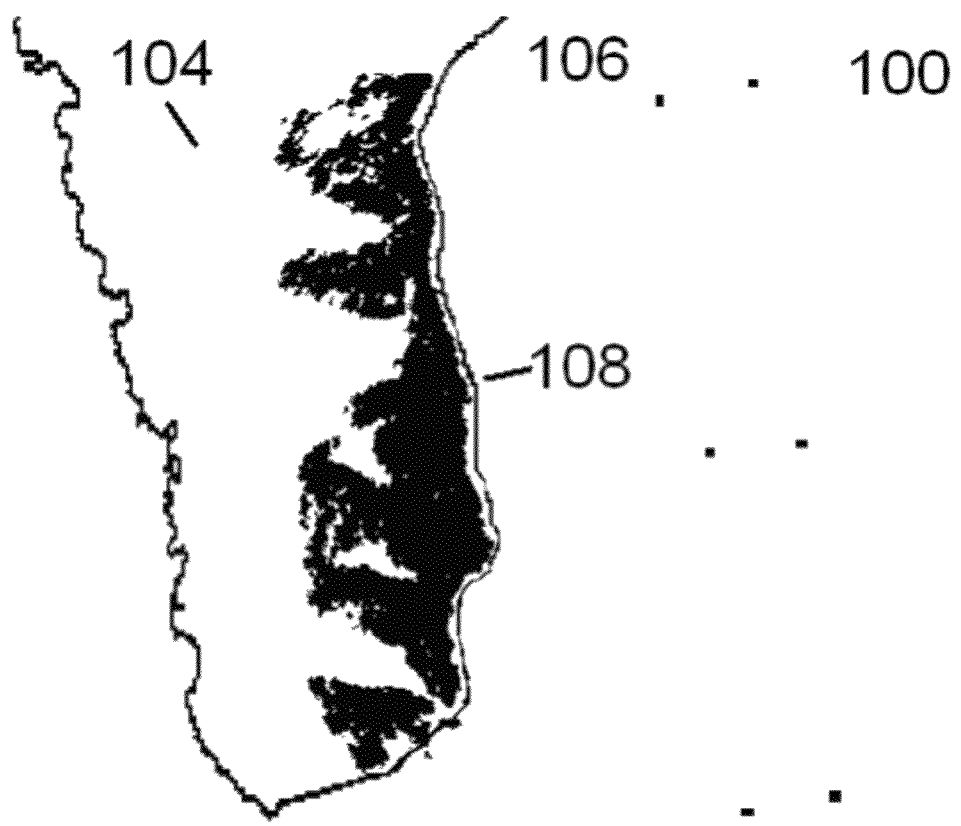

FIG. 10 (Chartradarcombine2.bmp) shows how the original radar image 100 would look like if it was placed on top of the chart map 104, except FIG. 10 shows only the radar return 106 for the land mass 108, and not the other features.

Figure 11:
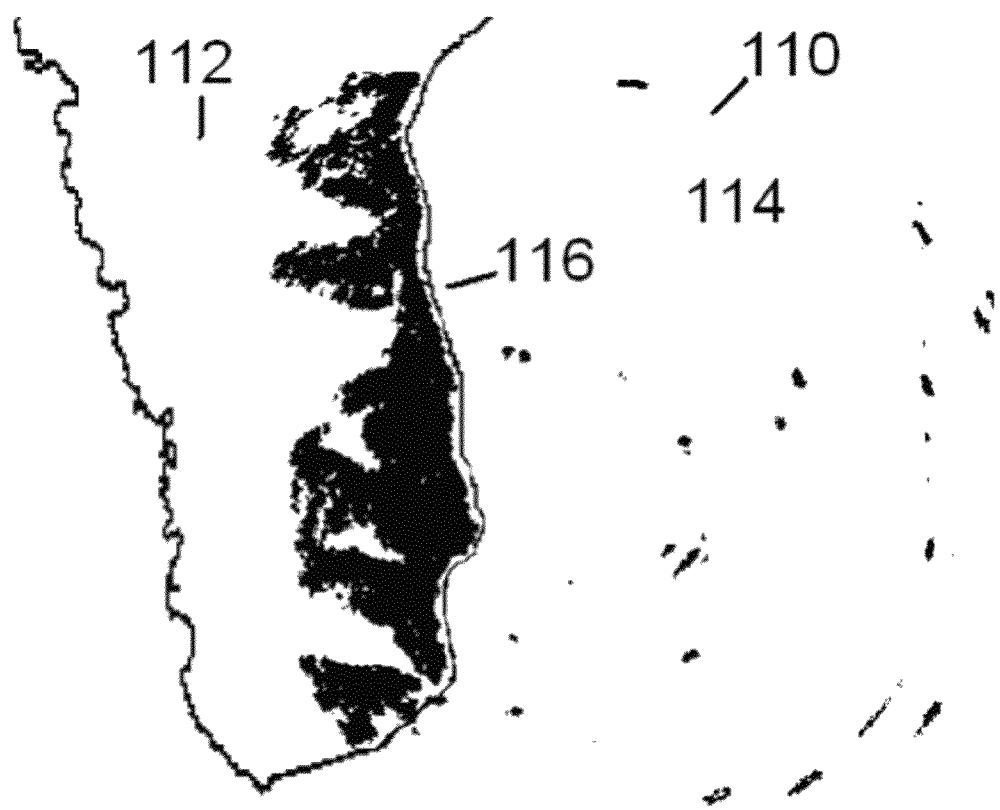

FIG. 11 (Chartradarcombine3.bmp) shows how the original radar image 110 would look like if it was placed on top of the chart map 112. FIG. 11 shows the radar return 114 for the land mass 108 and other features.

Figure 12:
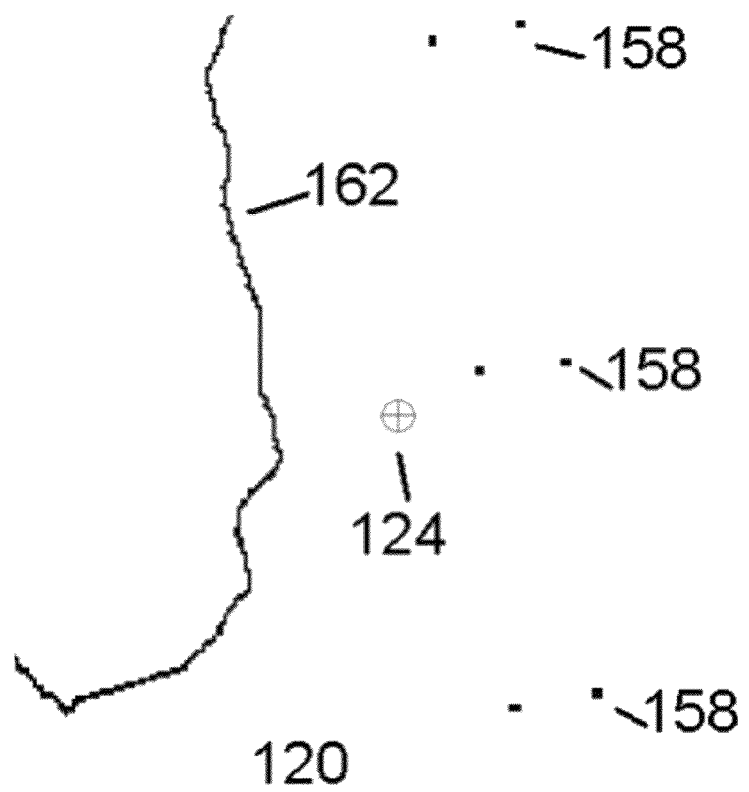

FIG. 12 (Chart2crop.bmp) shows a cropped version 120 of FIG. 4 (Chart2.bmp) with a center point 124, which is the same size as the radar image, showing coastline 162 and buoys 158, and would be the final product of the correlation. Once the correlation happens and a translation in x and y is specified for the chart image, the image of the chart map is cropped to match the radar map, locate the center of the radar map, which is the location of the robot, and find that location in pixels in the chart map.

This pixel location can be translated in the Chart Server 34 in FIG. 2 into a latitude/longitude registration location for the USV 10 of FIG. 1 (the Chart Server 34 knows how every pixel in its map corresponds to a latitude/longitude location).

One algorithm that can be used in this technique relies on the translation property of the Fourier transform, also known as the Fourier shift theorem. The Fourier shift theorem guarantees that the phase of the cross-power spectrum is equivalent to the phase difference between the images. By taking the inverse Fourier transform of the representation in the frequency domain, we are left with an impulse function, which is a graph where it is approximately zero everywhere except at the displacement in x and y that is needed to correlate the two images.

Another algorithm that can be used called Iterative Closest Point (ICP) minimizes the difference between two clouds of points by iteratively revising the translation and rotation to minimize the distance and error between the points of the two clouds of points. This algorithm returns the displacement in x and y as well as rotation of the point clouds which can be applied to the center location of the radar map into the latitude/longitude coordinate of the Chart Server.

From the above description of the Registration of Latitude/Longitude Coordinates Using Range Detection Sensors and Digital Nautical Charts, it is apparent that various techniques may be used for implementing the concepts of the present invention without departing from its scope.

For instance, while a USV has been utilized as described above, the aspects of the present invention could be utilized with any type of surface vehicle. The process for determining latitude/longitude registration is also not limited to any particular type of vehicle. The preferred range detection sensor is radar; however, sonar, laser rangefinders, ladar and cameras could be utilized, and any digital map which has latitude/longitude mapping could be utilized as well. The described embodiments are to be considered in all respects as illustrative and not restrictive. It should also be understood that the present invention is not limited to the particular embodiments described herein, but is capable of many embodiments without departing from the scope of the claims.

What is claimed is:

1. A latitude/longitude registration apparatus comprising:
    a digital nautical chart server for providing pixel image representations of a world-wide map, including nautical features, together with respective latitude/longitude coordinates,
    a range detector sensor for providing return images representing reflected local nautical features and the current local location, and
    a correlator for correlating the pixel representations and the return images of the local features to provide a registration of the current local latitude/longitude coordinates.

2. The apparatus of claim 1 wherein the range detector sensor comprises a radar.

3. The apparatus of claim 1 wherein the range detector sensor comprises a sonar.

4. The apparatus of claim 1 wherein the range detector sensor comprises a ladar.

5. The apparatus of claim 1 wherein the range detector sensor comprises a camera.

6. The apparatus of claim 1 wherein the nautical features comprise coastlines, piers, buoys, shallow water and the like and the apparatus comprises means for filtering the image representations of selected ones of the nautical features.

7. A latitude/longitude registration apparatus for a surface vehicle comprising:
    a digital nautical chart server for providing pixel image representations of a world-wide map, including nautical features, together with respective latitude/longitude coordinates,
    a radar sensor for providing return radar images representing reflected local nautical features and the current local location of the surface vehicle, and
    a correlator for correlating the pixel representations and the return images of the local features to provide a registration of the current local latitude/longitude coordinates of the surface vehicle.

8. A latitude/longitude registration method comprising the steps of:
    providing pixel image representations of a world-wide map from a digital nautical chart server, the pixel image representations including nautical features, together with respective latitude/longitude coordinates,
    providing return images from a range detector sensor, the return images representing reflected local nautical features and the current local location, and
    correlating the pixel representations and the return images of the local features to provide a registration of the current local latitude/longitude coordinates.

9. The method of claim 8 wherein the nautical features include coastlines, piers, buoys, shallow water and the like and comprising the step of filtering the image representations of selected ones of the nautical features.

\* \* \* \* \*